United States Patent
Yang et al.

(10) Patent No.: US 8,217,628 B2
(45) Date of Patent: Jul. 10, 2012

(54) BATTERY PACK WITH AN AUTOMATIC CURRENT REGULATION AND CHARGING METHOD FOR THE SAME

(75) Inventors: Jongwoon Yang, Yongin-si (KR); Susumu Segawa, Yongin-si (KR); Sesub Sim, Yongin-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 495 days.

(21) Appl. No.: 12/453,647

(22) Filed: May 18, 2009

(65) Prior Publication Data

US 2009/0295334 A1 Dec. 3, 2009

(30) Foreign Application Priority Data

Jun. 3, 2008 (KR) .................. 10-2008-0052276

(51) Int. Cl.
*H02J 7/04* (2006.01)
(52) U.S. Cl. .................. 320/134; 320/152; 320/153
(58) Field of Classification Search .................. 320/152, 320/134, 153
See application file for complete search history.

(56) References Cited

U.S. PATENT DOCUMENTS

| 5,198,743 | A | * | 3/1993 | McClure et al. | ............... 320/145 |
| 2005/0173985 | A1 | | 8/2005 | Eguchi et al. | |
| 2006/0152194 | A1 | | 7/2006 | Wang et al. | |
| 2007/0188148 | A1 | * | 8/2007 | Kawasumi et al. | ............ 320/134 |
| 2009/0273314 | A1 | * | 11/2009 | Yoshikawa | .................... 320/134 |

FOREIGN PATENT DOCUMENTS

| JP | 07-015884 A | 1/1995 |
| JP | 8-190936 A | 7/1996 |
| JP | 11-026026 A | 1/1999 |
| JP | 11-135090 A | 5/1999 |
| JP | 2001-128386 A | 5/2001 |
| JP | 2001-286068 A | 10/2001 |
| JP | 2006-197797 A | 7/2006 |
| JP | 2007-020399 A | 1/2007 |
| KR | 10-2000-0014599 A | 3/2000 |
| KR | 10 2006-0041711 | 5/2006 |
| KR | 10 2006-0130428 A | 12/2006 |

OTHER PUBLICATIONS

Notice of Allowance issued in corresponding Korean application, 10-2008-0052276, dated May 24, 2011.
Korean Office Action in KR 10 2008-0052276, dated Aug. 23, 2010 (Yang, et al.).
Japanese Office Action in JP 2009-134232, dated Jan. 18, 2011 (Yang, et al.).

* cited by examiner

*Primary Examiner* — Jay Patidar
(74) *Attorney, Agent, or Firm* — Lee & Morse, P.C.

(57) ABSTRACT

A battery pack includes a battery including a positive electrode and a negative electrode, a switching module including a charge switching device and a discharge switching device, the charge switching device and discharge switching device being electrically connected to a high current path of the battery, a battery management unit (BMU) electrically connected to the switching module, the BMU being configured to adjust a limit value for a charging current supplied by the charge switching device and to set a magnitude of the charging current supplied by the charge switching device to be equal to or less than the adjusted.

16 Claims, 3 Drawing Sheets

[FIG. 1]
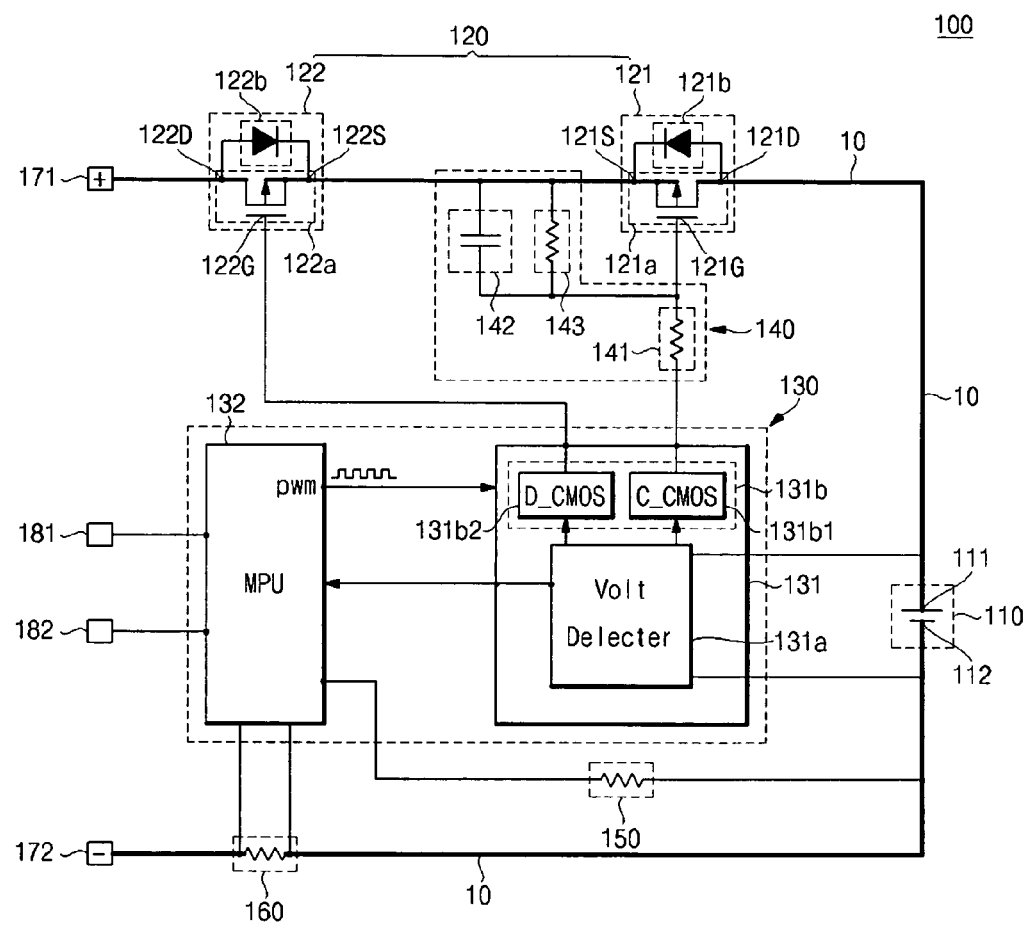

[FIG. 2]
| Temp( C) | 0 | 20 | 40 | 60 |
|---|---|---|---|---|
| 133—Charging Current(A) | 3.6A | 4A | 3.6A | 3.2A |
| Charging Ratio(%) | 90% | 100% | 90% | 80% |
[FIG. 3]
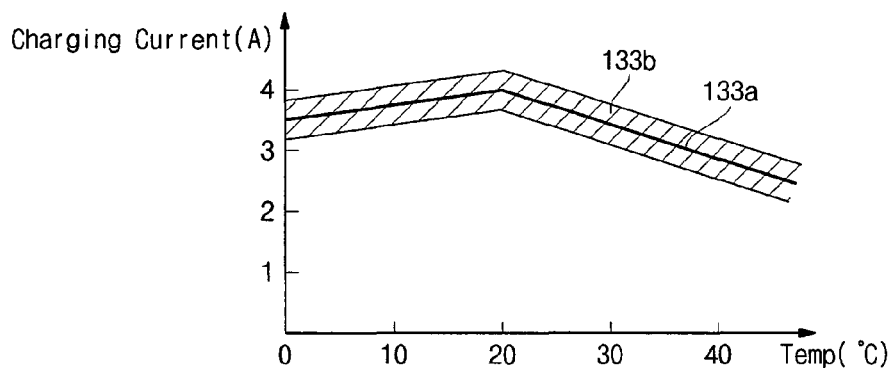
[FIG. 4]
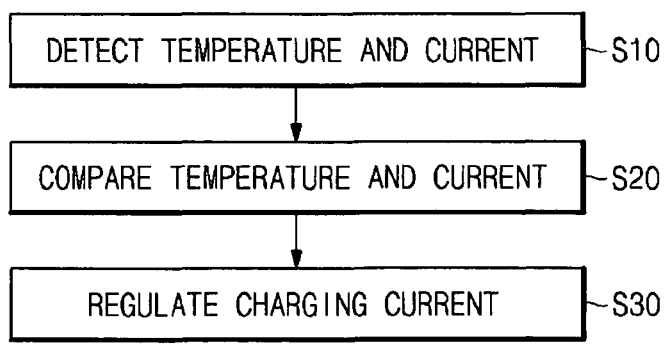

BATTERY PACK WITH AN AUTOMATIC CURRENT REGULATION AND CHARGING METHOD FOR THE SAME

BACKGROUND OF THE INVENTION

1. Field of the Invention

Example embodiments relate to a battery pack and a charging method for the same. More particularly, example embodiments relate to a battery pack that automatically regulates a charging current supplied from a charger, thereby securing stability, and to a charging method for the same.

2. Description of the Related Art

A conventional battery pack may include a battery, e.g., a lithium-ion battery or a lithium polymer battery, and a stability circuit electrically connected to the battery. The conventional battery may include an electrode assembly and an electrolyte sealed in its case, and may be charged/discharged via chemical reactions. The stability circuit of the conventional battery pack may prevent overcharge/overdischarge of the battery by regulating the charge-discharge process of the battery.

When the conventional battery pack is electrically connected to a charger, however, a magnitude of a charging current may be a predetermined value set by the charger before charging of the battery begins. As a result, the conventional battery pack may be always charged with a same charging current regardless of external conditions, e.g., when the surrounding temperature is very low in the winter and/or when the surrounding temperature is very high in the summer. In other words, even if external conditions are modified, e.g., when the surrounding temperature of the battery pack is very low or high, and charging characteristics of the battery pack are changed with respect to the external conditions, e.g., an internal resistance of the battery pack is changed in accordance with the low/high temperature, the conventional battery pack is charged with a same predetermined charging current from the charger.

For example, when the conventional battery pack is charged in high temperature surroundings, e.g., an interior of a vehicle in the summer, an internal heat radiation of the battery pack may increase. Accordingly, when the charging current continuously flows from the charger into the battery pack with the increased internal heat radiation, a circuit device of the battery pack may be damaged due to the internal heat radiation. In another example, when the conventional battery pack is charged in low temperature surroundings, e.g., an interior of a vehicle in the winter, the charging current having an impulse component may instantaneously flow into the battery pack, thereby damaging the circuit device of the battery pack.

SUMMARY OF THE INVENTION

Example embodiments are therefore directed to a battery pack and a charging method for the same, which substantially overcome one or more of the shortcomings and disadvantages of the related art.

It is therefore a feature of an example embodiment to provide a battery pack with a battery having a structure capable of automatically regulating a charging current supplied from a charger to the battery in order to secure stability.

It is another feature of an example embodiment to provide a method of charging a battery pack by automatically regulating a charging current supplied thereto from a charger in order to secure stability.

At least one of the above and other features may be realized by providing a battery pack, including a battery including a positive electrode and a negative electrode, a switching module including a charge switching device and a discharge switching device, the charge switching device and discharge switching device being electrically connected to a high current path of the battery, and a battery management unit (BMU) electrically connected to the switching module, the BMU being configured to adjust a limit value for a charging current supplied by the charge switching device and to set a magnitude of the charging current supplied by the charge switching device to be equal to or less than the adjusted limit value.

The limit value of the charging current may be varied and set according to temperature change of the battery, and the BMU may charge the battery so that the charging current of the battery does not exceed the limit value of the charging current.

The limit value of the charging current may be set such that a charge ratio of the battery may be about 100% at a temperature within a range of about 18° C. to about 30° C., and may be below about 100% at a temperature out of the range.

The battery pack may include a temperature sensor electrically connected to the BMU and the high current path, and a voltage smoothing circuit electrically connected to the charge switching device, the BMU, and the high current path of the battery. In this case, the BMU may apply a pulse-width modulation (PWM) signal to the voltage smoothing circuit and may regulate the charging current of the charge switching device by varying the duty ratio of the PWM signal according to a temperature measured by the temperature sensor.

In this case, the temperature sensor may be a thermistor, and the BMU may detect temperature of the battery by detecting resistance changing rate of the thermistor.

The voltage smoothing circuit may convert the PWM signal to a direct current (DC), and the BMU may regulate the DC by regulating the duty ratio of the PWM signal.

The charge switching device may include a field-effect transistor (FET) having a source, a drain, and a gate, the source and the drain being electrically connected to the high current path of the battery, the gate being electrically connected to the BMU. In this case an DC voltage output from the voltage smoothing circuit may be applied to the gate and the source.

The voltage smoothing circuit may include a resistor electrically connected to the gate and the BMU, and a capacitor electrically connected to the gate and the source between them. In this case, the voltage smoothing circuit may further include a buffer resistor electrically connected in parallel to the capacitor.

The battery pack may further include a current detection device, wherein the BMU may be electrically connected to the current detection device to calculate a current flowing on the high current path of the battery.

The current detection device may include a sense resistor, and the BMU may be informed of reference voltages of both ends of the sense resistor and may detect a current flowing on the high current path of the battery by detecting a change value of the difference between the voltages of both the ends of the sense resistor.

The BMU may include an analog front end electrically connected to the battery to detect an open circuit voltage of the battery and electrically connected to the voltage smoothing circuit to turn on or off the charge switching device and the discharge switching device, and a microprocessor unit electrically connected to the analog front end, and may control a current of the charge switching device by applying a PWM signal to the analog front end.

The analog front end may include a voltage detector electrically connected to the battery to detect an open circuit voltage of the battery and having an over-discharge mode, a full discharge mode, a full charge mode, and an overcharge mode that may be determined according to the open circuit voltage of the battery, and a power drive circuit for turning on or off the charge switching device and the discharge switching device.

The power drive circuit may amplify an applied PWM signal generated in the microprocessor unit and may supply amplified power to the switching device.

The analog front end may be an application specific integrated circuit (ASIC).

Meanwhile, a maximum rated power of the charge switching device may be set in consideration of a charging voltage of the charger, an open circuit voltage of the battery, and a limit value of a charging current, and may be set to within about 80% to about 120% of a power obtained by multiplying a difference voltage obtained by subtracting the open circuit voltage from the charging voltage, by a charging current flowing on the high current path of the battery.

After maintaining the initial current of the charge switching device low for a predetermined time period during the initial charging operation of the battery, the BMU may precharge the battery by increasing the charging current according to a charging capacity of the battery after a lapse of a predetermined time period.

The charge switching device may include a charge FET electrically connected to the high current path of the battery, and a parasitic diode for a charge FET electrically connected in parallel to the charging FET and connected in the reverse direction with respect to a charge current.

The discharge switching device may include a discharge FET electrically connected to the high current path of the battery, and a parasitic diode for a charge FET electrically connected in parallel to the charging FET and connected in the reverse direction with respect to a discharge current.

At least one of the above and other features may be also realized by providing a charging method for a battery pack having a battery with positive and negative electrodes, the method including electrically connecting a battery management unit (BMU) to a switching module, the switching module including a charge switching device and a discharge switching device, the charge switching device and discharge switching device being electrically connected to a high current path of the battery, setting a limit value for a charging current supplied by the charge switching device to the battery with respect to temperature of the battery via the BMU, and automatically regulating a magnitude of a charging current supplied by the charge switching device to the battery, such that the magnitude of the charging current is equal to or less than the adjusted limit value set by the BMU.

At least one of the above and other features may be also realized by providing a charging method for a battery pack, including detecting temperature and current of a battery, comparing the detected current to a value set using a limit value for the charging current for the detected temperature, limit values varying with temperature, and regulating a charging current of the battery, such that the charging current of the battery does not exceed the limit value of the charging current.

Regulating the charging current of the battery may include determining whether the detected current of the battery is above a hysteresis region, the hysteresis having positive and negative deviations with respect to current values for a given temperature, and reducing the charging current below the hysteresis region when the detected current of the battery is above the hysteresis region for the detected temperature.

Regulating the charging current of the battery may include determining, after calculating a consumption power consumed by the charge switching device, whether the consumption power of the charge switching device exceeds a limit power setting value, and reducing the charging current below a specific threshold value when the consumption power of the charge switching device exceeds the limit power setting value.

The consumption power of the charge switching device may be set in correspondence to a charging voltage of the charger, an open circuit voltage of the battery, and a limit value of a charging current, and may obtained by multiplying a difference voltage obtained by subtracting the open circuit voltage from the charging voltage, by the charging current.

BRIEF DESCRIPTION OF THE DRAWINGS

The above and other features and advantages will become more apparent to those of ordinary skill in the art by describing in detail exemplary embodiments with reference to the attached drawings, in which:

FIG. 1 illustrates a block diagram of a battery pack according to an example embodiment;

FIG. 2 illustrates an example of a lookup table in a MPU of FIG. 1;

FIG. 3 illustrates a graph for the lookup table of FIG. 2;

FIG. 4 illustrates a flowchart of a charging method for a battery pack according to an example embodiment.

DETAILED DESCRIPTION OF THE INVENTION

Figure 5:
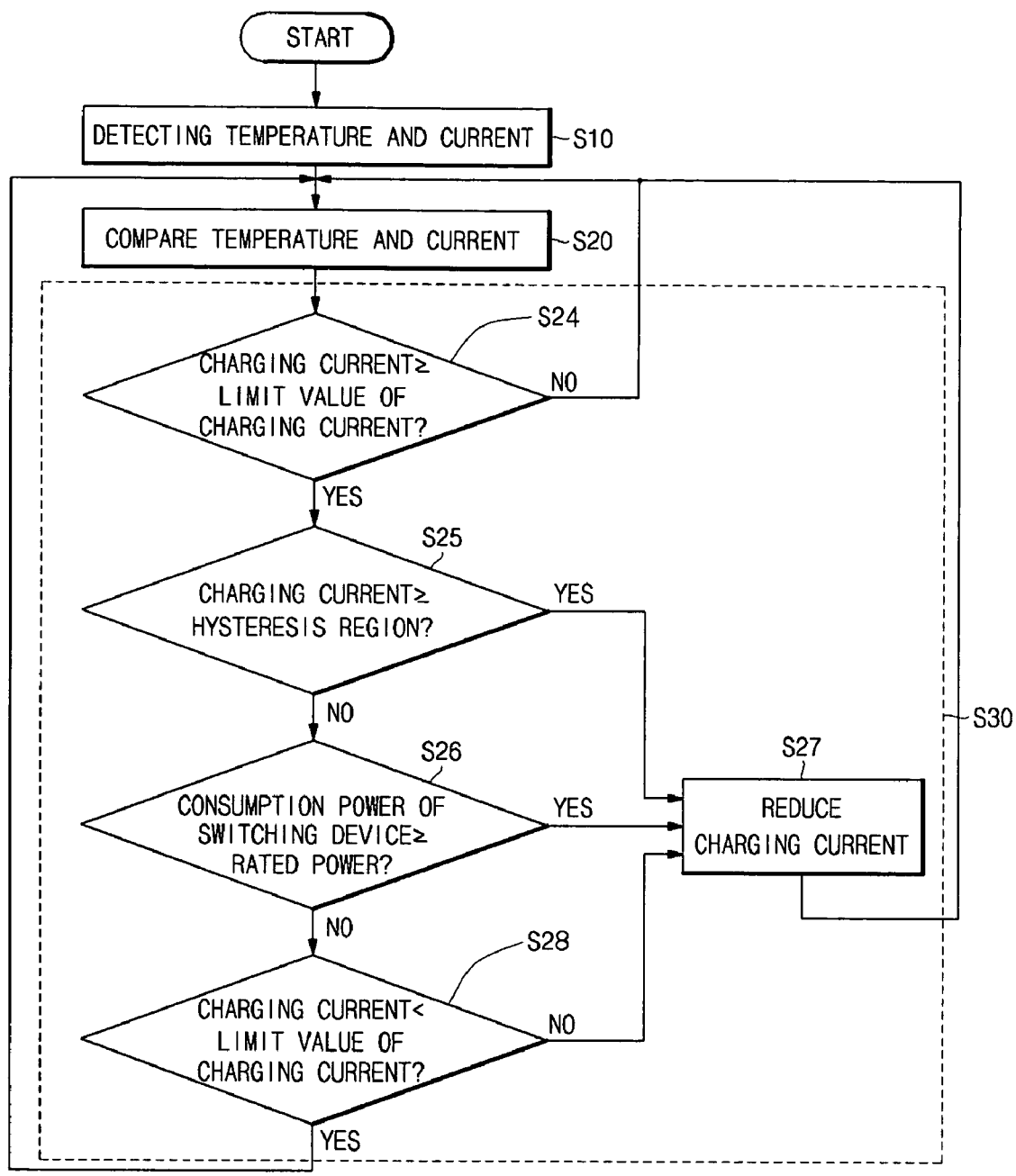
FIG. 5 illustrates a detailed flow chart of FIG. 4.

Korean Patent Application No. 10-2008-0052276, filed on Jun. 3, 2008, in the Korean Intellectual Property Office, and entitled: "Battery Pack and Charging Method for the Same," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments may be provided so that this disclosure will be thorough and complete, and will fully convey the scope of the invention to those skilled in the art.

In the drawing figures, the dimensions of elements and regions may be exaggerated for clarity of illustration. It will be understood that when an element is referred to as being "between" two elements, it can be the only element between the two elements, or one or more intervening elements may also be present. It will also be understood that when an element is referred to as being "connected to" an element, it can be directly connected to the element or additional elements may be present therebetween. Like reference numerals refer to like elements throughout.

As used herein, the terms "a" and "an" are open terms that may be used in conjunction with singular items or with plural items.

FIG. 1 illustrates a block diagram of a battery pack according to an example embodiment.

As illustrated in FIG. 1, a battery pack 100 according to example embodiments may include a battery 110, a switching module 120, and a battery management unit (BMU) 130. The battery pack 100 may further include a voltage smoothing circuit 140, a temperature sensor 150, a current detection device 160, and a positive terminal 171 and a negative terminal 172 that may be electrically connected to a charger or to an external load. The battery pack 100 may further include a first auxiliary terminal 181 and a second auxiliary terminal 182 that may be electrically connected to a microprocessor unit 132 for communication with external devices.

The battery 110 may be a rechargeable battery having a positive electrode 111 and a negative electrode 112. For example, the battery 110 may be a lithium ion battery or a lithium polymer battery, and may have an electrode assembly and an electrolyte sealed in its case. It is noted that even though only one battery 110 is illustrated in FIG. 1, any suitable number of batteries 110, e.g., a plurality of batteries, may be provided in the battery pack 100.

The switching module 120 may include a charge switching device 121 and a discharge switching device 122. The charge switching device 121 may include a charge field-effect transistor (FET) 121a and a parasitic diode 121b for the charge FET 121a. The discharge switching device 122 may include a discharge FET 122a and a parasitic diode 122b for the discharge FET 122a.

The charge FET 121a of the charge switching device 121 may have a drain 121D and a source 121S that may be installed on a high current path 10 of the battery 110. The charge FET 121a may have a gate 121G electrically connected to an analog front end 131, and may be turned on or off by a control signal input from the analog front end 131. When a charger (not shown) is electrically connected to the positive terminal 171 and the negative terminal 172, the charge FET 121a may be turned on to apply a charging current from the charger to the battery 110.

The parasitic diode 121b of the charge switching device 121 may be electrically connected in parallel to the charge FET 121a. The parasitic diode 121b may be connected in a reverse direction with respect to the charging current. The parasitic diode 121b may interrupt a path of the charging current when the battery 110 is fully charged. Accordingly, the parasitic diode 121b may pass only the discharging current when the battery 110 is fully charged, so the battery 110 may be prevented from being over-charged. Thus, the stability of the battery 110 may be improved.

The discharge FET 122a of the discharge switching device 122 may have a drain 122D and a source 122S that may be installed on the high current path 10 of the battery 110. The discharge FET 122a may have a gate 122G electrically connected to the analog front end 131, and may be turned on or off by a control signal input from the analog front end 131. The discharge FET 122a may be turned on to apply a discharging current to an external load electrically connected to the positive terminal 171 and the negative terminal 172.

The parasitic diode 122b of the discharge switching device 122 may be electrically connected in parallel to the discharge FET 122a. The parasitic diode 122b may be connected in the reverse direction with respect to the discharging current. The parasitic diode 122b may interrupt a path of the discharging current when the battery 110 is fully discharged. Accordingly, the parasitic diode 122b may pass only the charging current when the battery 110 is fully discharged, so the battery 110 may be prevented from being over-discharged. Thus, the stability of the battery 110 may be improved.

The BMU 130 may include an analog front end 131 and a microprocessor unit (MPU) 132. The analog front end 131 may include a voltage detector 131a and a power drive circuit 131b.

The voltage detector 131a of the analog front end 131 may be electrically connected to both the positive electrode 111 and the negative electrode 112 of the battery 110. The voltage detector 131a may be a voltage detection circuit, e.g., a voltage comparator. The voltage detector 131 may detect a voltage difference between the positive electrode 111 and the negative electrode 112 of the battery 110 to determine whether the mode of the battery 110 is an over-discharge mode, a full-discharge mode, a full-charge mode, or an over-charge mode according to the voltage of the battery 110. The voltage detector 131 may output a high level control signal to the power drive circuit 131b to turn on the switching module 120 or may output a low level control signal to turn off the switching module 120 according to the mode of the battery 110.

The power drive circuit 131b of the analog front end 131 may control the switching module 120 according to the output signal received from the voltage detector 131. The power drive circuit 131b may include a charging power drive circuit 131b1 and a discharging power drive circuit 131b2.

The charging power drive circuit 131b1 may be electrically connected to the gate 121G of the charge FET 121a to turn on or off the charge FET 121a. The charging power drive circuit 131b1 may be electrically connected to the voltage detector 131a. Accordingly, the charging power drive circuit 131b1 may turn on or off the charge switching device 121 in response to the output signal from the voltage detector 131a in accordance with the mode of the battery 110.

The charging power drive circuit 131b1 may be electrically connected to the MPU 132 to receive a pulse width modulation (PWM) signal output from the MPU 132, and may amplify the PWM signal. The charging power drive circuit 131b1 may output the amplified PWM signal to the voltage smoothing circuit 140. In other words, the charging power drive circuit 131b1 may amplify a control signal of a high level output by the voltage detector 131a to turn on/off the charge switching device 121. The charging power drive circuit 131b1 may amplify the PWM signal output from the MPU 132, and may regulate the charging current of the charge switching device 121. The charging power drive circuit 131b1 may be a switching circuit, e.g., a C-MOS FET.

The discharging power drive circuit 131b2 may be electrically connected to the gate 122G of the discharge FET 122a to turn on or off the discharge FET 122a. The discharging power drive circuit 131b2 may be electrically connected to the voltage detector 131a, and may turn on/off the discharge switching device 122 in response to the output signal of the voltage detector 131a in accordance with the mode of the battery 110. The discharging power drive circuit 131b2 may be a switching circuit, e.g., a C-MOS FET.

The analog front end 131 may be an application-specific integrated circuit (ASIC) for immediately detecting the voltage of the battery 110 and driving the switching module 120 in accordance with the voltage of the battery 110. Accordingly, the analog front end 131 may be operated at a very fast response speed according to the mode of the battery 110, i.e., detected voltage of the battery 110, so the battery 110 may be protected by immediate driving, i.e., turning on/off, of the switching module 120.

Since a maximum rated power of the charge switching device 121 controlled by the charging power drive circuit 131b1 of the analog front end 131 may increase as a current flow increases, a required consumption power of the analog front end 131, i.e., a power driven circuit device driving the charge switching device 121, may increase as well. Nevertheless, since a power consumption of the analog front end 131, i.e., a power driven ASIC, may be predetermined before connection thereof to the battery pack 100, the maximum rated power of the charge switching device 121 may be suitably adjusted. In other words, according to example embodiments, the maximum rated power of the charge switching device 121 may be set to correspond to the predetermined power consumption of the analog front end 131 according to the charging voltage of the charger, the voltage of the battery 110, and the charging current in the high current path 10.

More specifically, the maximum rated power of the charge switching device 121 may be set as about 80% to about 120% of a calculated consumption power of the charge switching device 121. The calculated consumption power of the charge switching device 121 may be obtained by multiplying the charging current by a voltage difference between the charger voltage and the battery 110 voltage. In this respect, it is noted that the charging current refers to the current flowing in the high current path 10 of the battery 110, the charger voltage refers to the charging voltage of the charger electrically connected to the positive and negative terminals 171 and 172, and the battery 110 voltage refers to the open circuit voltage of the battery 110 measured between the positive and negative electrodes 111 and 112.

The maximum rated power of the charge switching device 121 may be set to about 80% of the calculated consumption power of the charge switching device 121 or higher, so a sufficient amount of charging/discharging current may flow in the high current path 10 of the battery 110. The maximum rated power of the charge switching device 121 may be set to about 120% of the calculated consumption power of the charge switching device 121 or lower, so the switching operation of the analog front end 131, i.e., driving of the charge switching device 121, may be carried out smoothly.

The MPU 132 of the BMU 130 may include a microprocessor (not shown), a passive device (not shown), an active device (not shown), and a memory (not shown) that may be electrically connected to the microprocessor. The MPU 132 may be electrically connected to the analog front end 131, and may receive voltage information of the battery 110 and detect the voltage of the battery 110. The MPU 132 may calculate the charging current flowing in the high current path 10 of the battery 110 during charge/discharge of the battery 110. In detail, the MPU 132 may be electrically connected to both ends of the current detection device 160, and may calculate the charging current in the high current path 10 by measuring a change in a voltage difference between both ends of the current detection device 160. The current detection device 160 may be installed on the high current path 10 of the battery 110, and may include, e.g., a sense resistor. The BMU 130 may receive reference voltages of both ends of the sense resistor to determine the current flowing in the high current path 10 of the battery 110 by detecting a change in a difference between the voltages of both ends of the sense resistor.

The MPU 132 may set a limit value of the charging current supplied by the charge switching device 121. The MPU 132 may generate a PWM signal to be transmitted to the charging power driver circuit 131b1, so the charging power driver circuit 131b1 may drive the switching device 121 with respect to the PWM signal to maintain the charging current within the limit value of the charging current set by the MPU 132. In detail, the charging power drive circuit 131b1 may amplify the PWM signal and may apply the amplified PWM signal to the voltage smoothing circuit 140. The limit value of the charging current may be set to provide stability to the battery pack 100, i.e., charging the battery 110 with a low current when the battery pack 100 is at a low or high temperature.

The MPU 132 may be electrically connected to the temperature sensor 150, and may detect the temperature of the battery 110. The limit value of the charging current may be adjusted in accordance with the temperature of the battery 110, as will be discussed in more detail below with reference to FIGS. 2-3.

FIG. 2 illustrates a temperature/current correlation lookup table in the MPU 132. FIG. 3 illustrates a current/temperature graph for the look table of FIG. 2. As illustrated in FIGS. 2 and 3, a limit value 133a of the charging current may be changed in accordance to a change of temperature.

In detail, a temperature sensor 150 may be electrically connected to the MPU 132 and to the high current path 10 of the battery 110. For example, the temperature sensor 150 may be a thermistor. The MPU 132 may detect a resistance change rate of the thermistor, and may use the resistance change to detect a temperature of the battery 110, i.e., corresponding to a temperature change outside the battery pack 100.

For example, as illustrated in FIG. 2, the MPU 132 may include a lookup table including temperature variation of the battery 110 within a range of about 0° C. to about 60° C. In the lookup table of FIG. 2, a charge ratio refers to a percentage of an actually charged capacity of the battery 110 relative to a total power capacity of the battery 110. As illustrated in FIG. 2, a limit value of the charging current of about 4 A corresponding to a charge ratio of about 100% may flow at about 20° C. at atmospheric pressure. As further illustrated in FIG. 2, a limit value of the charging current of about 3.6 A corresponding to a charge ratio of about 90% may flow at about 0° C. and 40° C., i.e., a low temperature. As further illustrated in FIG. 2, a limit value of a charging current of about 3.2 A corresponding to a charge ratio of about 80% may flow at about 60° C., i.e., a high temperature. In other words, the battery 110 may be supplied with a current having a limit value of about 4 A as a charging current for maintaining a charge ratio of about 100% at room temperature, and may be supplied with current having limit values below about 4 A as a charging current for maintaining a charge ratio below about 100% at high and low temperatures, i.e., temperatures below and/or above room temperature.

In this respect, it is noted that room temperature refers to a temperature of about 18° C. to about 30° C., e.g., about 20° C. Further, a temperature of about 0° C. to about 40° C. is only an exemplary temperature range, and example embodiments may include a temperature range of about (−20)° C. to about 120° C. For example, low temperature may include temperature below room temperature, e.g., about 10° C. to about (−20)° C., and high temperature may include temperature above room temperature, e.g., about 30° C. to about 120° C. It is further noted that a charging ratio of about 80% to about 100% is only an exemplary charging ratio range, and embodiments may include a charging ratio of about 50% to about 100% according to temperature change of the battery 110 from about (−20)° C. to about 120° C.

The MPU 132 may regulate the charging current according to the lookup table by varying a duty ratio of the PWM signal applied to the analog front end 131, thereby preventing the current flowing through the charge switching device 121 from exceeding the limit value 133a of the charging current in the lookup table. Accordingly, the battery pack 100 may be charged with a low current even in a low or high temperature environment, thereby securing stability. In this case, the duty ratio may refer to a ratio between a time period required for maintaining a high level state and a time period of one cycle of the PWM signal having pulse waves.

The MPU 132 may perform a pre-charging operation for reducing an initial amount of current in the charge switching device 121 for a predetermined time period during the initial charge of the battery 110. More particularly, when the charger is electrically connected to the positive terminal 171 and the negative terminal 172, the MPU 132 may occasionally, e.g., at high temperatures, supply an excessive amount of charging current to the battery 110, e.g., a high current pulse, in spite of the internally set limit value of the charging current. As a result, when the battery 110 is supplied with a very large amount of current within a very short time period, the battery may malfunction, e.g., exhibit internal deterioration and/or short lifespan. In order to prevent this phenomenon, the MPU 132 according to example embodiments may be set to automatically reduce the initial amount of current of the charge switching device 121 for a predetermined time period during the initial charge of the battery 110, e.g., during the predetermined time period the initial amount of current may be set to a value lower than the limit value of the charging current, thereby enabling stable supply of the charging current. After the pre-charging operation of the battery 110, i.e., after the predetermined time period, the MPU 132 may adjust the current to the limit value of the charging current according to the values in FIGS. 2-3 to continue the charge of the battery 110, thereby securing the stability of the battery 110.

The voltage smoothing circuit 140 may include a resistor 141 and a capacitor 142. The voltage smoothing circuit 140 may further include a buffer resistor 143.

The resistor 141 may be electrically connected to the gate 121G of the charge FET 121a and to the BMU 130. The capacitor 142 may be electrically connected to the gate 121G of the charge FET 121a and to the source 121S of the charge FET 121a. The voltage smoothing circuit 140 may change the PWM signal amplified by and output from the charging power drive circuit 131b1 to a direct current (DC) voltage, so the DC voltage may be applied between the gate 121G and the source 121S of the charge FET 121a.

In this case, a negative voltage difference may be formed between the gate 121G and the source 121S of the charge FET 121a. The magnitude of the DC voltage applied to the gate 121G and the source 121S of the charge FET 121a may increase when the MPU 132 increases the duty ratio of the PWM signal, so the negative voltage difference between the gate 121G and the source 121S of the charge FET 121a may decrease and the amount of current flowing from the source 121S to the drain 121D may increase.

On the other hand, the magnitude of the DC voltage applied to the gate 121G and the source 121S may decrease when the MPU 132 decreases the duty ratio of the PWM signal. Thus, the negative voltage between the gate 121G and the source 121S of the charge FET 121a may increase, and the amount of current flowing from the source 1231S to the drain 121D may decrease.

The buffer resistor 143 may be electrically connected in parallel to the capacitor 142. The buffer resistor 143 may absorb an impulse component of the PWM signal amplified by the charging power drive circuit 131b1, thereby protecting the charge FET 121a. The buffer resistor 143 may create a negative voltage difference between the gate 121G and the source 121S of the charge FET 121a to regulate the initial amount of current flowing from the source 121S to the drain 121D of the charge FET 121a.

Hereinafter, a driving operation of the battery pack 100 during charge of the battery 110 will be described in detail.

For example, it will be assumed that the voltage of the battery 110 is 0.9 V, the analog front end 131 is in an overdischarge mode, and the power sources of the analog front end 131 and the MPU 132 are switched off to reduce power consumption.

When the charger is electrically connected to the positive terminal 171 and the negative terminal 172 of the battery pack 100 to supply the charging current, the mode of the analog front end 131 may be changed from the over-discharge mode to a full discharge mode, and the charge switching device 121 may be turned on by the analog front end 131. In this case, the MPU 132 may apply the PWM signal to the charging power drive circuit 131b1 of the analog front end 131 from a time point when the charger is electrically connected to the positive terminal 171 and the negative terminal 172 to supply the charging current. Next, the charging power drive circuit 131b1 may apply the amplified PWM signal to the voltage smoothing circuit 140, so the voltage smoothing circuit 140 may convert the PWM signal to a DC voltage to be applied to the gate 121G and the source 121S of the charge FET 121a. It is noted that initially the MPU 132 may output the duty ratio of the PWM signal at about 90% for a predetermined time period from the instant the charger is connected to the positive terminal 171 and the negative terminal 172 in order to pre-charge the charge switching device 121 with a lower charging current. After a lapse of the predetermined time period, the MPU 132 may reduce the duty ratio of the PWM signal by about 50% to supply the charging current to the charge switching device 121 at an operational level. The pre-charging operation of the battery 110, i.e., supply of lower initial current, may prevent deterioration of the battery 110.

Once the battery 110 is pre-charged, the MPU 132 may detect the temperature of the battery 110 using the temperature sensor 150, and may detect the charging current flowing in the high current path 10 of the battery 110 using the current detection device 160. The MPU 132 may refer to the lookup table, e.g., the lookup table of temperature-to-current table of FIG. 2, in order to determine the limit value of the charging current corresponding to the detected temperature and charging current. The temperature and current may be continuously monitored, so the limit value of the charging current may be continuously calculated and adjusted.

For example, the MPU 132 may increase the duty ratio of the PWM when the detected temperature and charging current of the battery 110 exceed the corresponding limit value 133a of the charging current in the lookup table of FIG. 2. Accordingly, the negative DC voltage applied between the gate 121G and the source 121S of the charge FET 121a may increase, and the current flowing from the source 121S to the drain 121D of the charge FET 121a may decrease. Then, the charging current may be reduced to a value lower than the limit value 133a of the charging current in the lookup table of FIG. 2, thereby securing stability of the battery 110. When the charging voltage of the battery 110 increases, e.g., to about 4.3 V, the analog front end 131 may be converted into a full-charge mode, and may turn off the charge switching device 121. Accordingly, stopping the charge of the battery 110 may require only the discharge switching device 122 being turned on.

As mentioned above, a battery pack 100 according to example embodiments may include a structure capable of continuously adjusting a limit value of the charging current with respect to external temperature in order to more stably charge the battery 110. Further, the limit value of the charging current may be changed and set according to the temperature of the battery 110, and the battery pack 100 may be charged with the charging efficiency of the battery 110 being properly maintained, thereby securing stability. Furthermore, the pre-charging operation of supplying a low initial charging current by the battery pack 100 during the initial connection of the charger may prevent or substantially minimize deterioration of the battery 110, thereby securing even greater stability. The battery pack 100 may charge/discharge the battery 110 according to the mode of the analog front end 131, e.g., according to the over-discharge mode, the full-discharge mode, the full-charge mode, and the over-charge mode, in which the voltage detector 131a and the power drive circuit 131b may be embedded, thereby securing even greater stability.

FIG. 4 illustrates a flowchart of a charging method for a battery pack according to an embodiment. FIG. 5 illustrates a detailed flowchart of FIG. 4.

As illustrated in FIGS. 4 and 5, a charging method for a battery pack according to an example embodiment may include step S10, i.e., detecting temperature and current, step S20, i.e., comparing temperature and current, and step S30, i.e., regulating charging current. The charging method may further include step S25, i.e., determining a hysteresis region, step S26, i.e., calculating power consumption of a switching device, and step S27, i.e., reducing charging current, as will be discussed in more detail below with reference to FIG. 5.

Hereinafter, an example charging method according to an embodiment will be described with reference to the battery pack 100, i.e., a battery pack having a structure described previously with reference to FIGS. 1-3, according to the flow chart of FIGS. 4-5.

In step S10, the MPU 132 may detect the temperature and current of the battery 110 via the temperature sensor 150 and the current detection device 160, respectively, as discussed previously with reference to FIGS. 1-3.

In step S20, the MPU 132 may compare the detected temperature and current of step S10 to corresponding reference values in the lookup table of FIG. 2. As discussed previously with reference to FIG. 1, the temperature-to-current table, i.e., lookup table in FIG. 2, may be embedded in the MPU 132, and the charging current in the battery 110 may be adjusted according to the limit value 133a in the lookup table according to the detected temperature of the battery 110.

In step S30, when the temperature and current detected by the MPU 132 are determined as exceeding the limit value 133a of the charging current in the temperature-to-current table in step S20, the charging current in the battery 110 may be reduced, i.e., adjusted such that the charging current of the charge FET 121a may not exceed the limit value 133a of the charging current of the lookup table. In this case, the charging current of the charge FET 121a may be regulated by controlling the duty ratio of the above-mentioned PWM signal.

As mentioned above, the charging method for a battery pack according to example embodiments may improve stability of the battery pack 100 by preventing the charging current of the battery pack 100 from exceeding the limit value 133a of the charging current through steps S10, S20, and S30.

The charging method may further include steps S24 through S27, as illustrated in FIG. 5. In particular, in step S24, if the detected charging current of the battery 110 is below the limit value 133a of the lookup table determined for the detected temperature in the comparison of step S20, the charging current may remain unchanged. If the detected current of the battery 110 is equal to or higher than the corresponding limit value in the lookup table determined for the detected temperature in the comparison of step S20, the method may proceed to step S25.

Step S25, as illustrated in FIG. 5, may determine whether the detected current of the battery 110 is above a hysteresis region having positive and negative deviations in the temperature-to-current table. In particular, as illustrated in FIG. 3, a hysteresis region 133b may be generated adjacent to curve 133a, i.e., a curve indicating the charging current limit with respect to temperature, for correcting measurement errors generated during temperature and current detection by the temperature sensor 150 and the current detection device 160. Accordingly, the hysteresis region 133b may be partitioned into regions having positive and negative deviations with reference to the limit value 133a of the charging current.

Therefore, if the detected current with respect to the detected temperature is larger than the corresponding values in the lookup table in step S20, the detected current may be evaluated in reference to the corresponding hysteresis region in step S25. If the detected current of the battery 110 is below an uppermost limit of the hysteresis region 133b illustrated in FIG. 3, i.e., within the hysteresis region 133b, the charging current may remain unchanged and proceed to step S26. If the detected current of the battery 110 is above the uppermost limit of the hysteresis region 133b illustrated in FIG. 3, i.e., outside the hysteresis region 133b, the charging current may be reduced in step S27.

In step S27, if the current of the battery 110 is within or above the hysteresis region, the charging current may be reduced below the hysteresis region to improve the stability of the battery pack.

In step S26, power consumption may be calculated and compared to the rated power. In particular, step S26 may determine whether the consumption power of the charge switching device 121 is equal to or higher than a set limit power value, i.e., rated power, by calculating the consumption power consumed by the charge switching device 121. In this case, the calculated consumption power of the charge switching device 121 may be set in consideration of the charging voltage of the charger, the open circuit voltage of the battery 110, and the charging current. More particularly, the calculated consumption power of the charge switching device 121 may be obtained by multiplying a difference voltage, i.e., obtained by subtracting the open circuit voltage from the charging voltage, by the charging current.

In step S26, if the consumption power of the charge switching device 121 is equal to or higher than the set limit power value, the charging current of the charge switching device 121 may be reduced. For example, when the MPU 132 sets the limit power value is set to about 500 W, the calculated consumption power consumed by the current charge switching device 121 may be calculated with the charging voltage of the charger, the open circuit voltage of the battery 110, and the charging current functioning as parameters. When the calculated consumption power consumed by the charge switching device 121 is equal to or higher than the limit power setting value, i.e. 500 W, the charging current flowing through the charge switching device 121 may be reduced to or below a specific threshold value in step S27 to secure the stability of the battery pack 100.

Steps S25 and S26 may be sequentially performed by determining their priorities. Furthermore, only one of steps S25 and S26 may be performed separately. In step S28, the detected charging current may be evaluated to determine whether the charging current is below the limit of the charging current.

According to the battery pack and the charging method of example embodiments, the charging current supplied from a charger may be automatically regulated, thereby enabling security of stability.

Exemplary embodiments of the present invention have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A battery pack, comprising:
   a battery including a positive electrode and a negative electrode;
   a switching module including a charge switching device and a discharge switching device, the charge switching device and discharge switching device being electrically connected to a high current path of the battery;
   a battery management unit (BMU) electrically connected to the switching module, the BMU being configured to adjust a limit value for a charging current supplied by the charge switching device and to set a magnitude of the charging current supplied by the charge switching device to be equal to or less than the adjusted limit value;
   a temperature sensor electrically connected to the BMU and to the high current path of the battery; and
   a voltage smoothing circuit electrically connected to the charge switching device, the BMU, and the high current path of the battery,
   wherein the BMU is configured to apply a pulse-width modulation (PWM) signal to the voltage smoothing circuit and to regulate the charging current of the charge switching device by varying a duty ratio of the PWM signal according to a temperature measured by the temperature sensor.

2. The battery pack as claimed in claim 1, wherein the BMU is configured to automatically adjust and set the limit value of the charging current according to a temperature change of the battery.

3. The battery pack as claimed in claim 1, wherein the temperature sensor is a thermistor, and the BMU is configured to detect temperature of the battery by detecting a resistance changing rate of the thermistor.

4. The battery pack as claimed in claim 1, wherein the voltage smoothing circuit is configured to convert the PWM signal to a direct current (DC), and the BMU is configured to regulate the DC by regulating the duty ratio of the PWM signal.

5. The battery pack as claimed in claim 4, wherein the charge switching device includes a field-effect transistor (FET) having a source, a drain, and a gate, the source and drain being electrically connected to the high current path of the battery, the gate being electrically connected to the BMU, and the gate and source being configured to receive a DC voltage output from the voltage smoothing circuit.

6. The battery pack as claimed in claim 5, wherein the voltage smoothing circuit includes a resistor electrically connected to the gate of the FET and to the BMU, and a capacitor electrically connected to the gate and to the source of the FET, the source being between the gate and the capacitor.

7. The battery pack as claimed in claim 6, wherein the voltage smoothing circuit further includes a buffer resistor electrically connected in parallel to the capacitor.

8. The battery pack as claimed in claim 1, further comprising a current detection device, the BMU unit being electrically connected to the current detection device to calculate a current flowing in the high current path of the battery.

9. The battery pack as claimed in claim 8, wherein the current detection device includes a sense resistor, the BMU being electrically connected to the sense resistor to receive reference voltages of both ends of the sense resistor to detect the current flowing in the high current path of the battery.

10. The battery pack as claimed in claim 1, wherein the BMU is configured to be pre-charged according to a charging capacity of the battery after maintaining the initial current of the charge switching device low for a predetermined time period during the initial charging operation of the battery, the battery management unit pre-charges the battery by increasing the charging current according to a charging capacity of the battery after a lapse of a predetermined time period.

11. A battery pack, comprising:
    a battery including a positive electrode and a negative electrode;
    a switching module including a charge switching device and a discharge switching device, the charge switching device and discharge switching device being electrically connected to a high current path of the battery; and
    a battery management unit (BMU) electrically connected to the switching module, the BMU being configured to adjust a limit value for a charging current supplied by the charge switching device and to set a magnitude of the charging current supplied by the charge switching device to be equal to or less than the adjusted limit value,
    wherein the BMU includes:
       an analog front end electrically connected to the battery and to the switching module via a voltage smoothing circuit, the analog front end being configured to detect voltage in an open circuit voltage of the battery and to turn on/off the charge switching device and discharge switching device in the switching module, and
       a microprocessor unit electrically connected to the analog front end, the microprocessor unit being configured to control a current of the charge switching device in the switching module.

12. The battery pack as claimed in claim 11, wherein the analog front end includes:
    a voltage detector electrically connected to the battery, the voltage detector being configured to detect the voltage in the open circuit of the battery and determine the battery state based on the detected voltage, the battery state being one of an over-discharge mode, a full discharge mode, a full charge mode, and an overcharge; and
    a power drive circuit, the power drive circuit being configured to turn on/off the charge switching device and the discharge switching device.

13. The battery pack as claimed in claim 12, wherein the power drive circuit is configured to amplify a PWM signal generated in the microprocessor unit and to supply the amplified power to the switching device.

14. A charging method for a battery pack, comprising:
    detecting temperature and current of a battery;
    comparing the detected current to a value set using a limit value for the charging current for the detected temperature, limit values varying with temperature; and
    regulating a charging current of the battery, such that the charging current of the battery does not exceed the limit value of the charging current,
    wherein regulating the charging current of the battery includes:
       determining whether the detected current of the battery is above a hysteresis region, the hysteresis having positive and negative deviations with respect to current values for a given temperature, and
       reducing the charging current below the hysteresis region when the detected current of the battery is above the hysteresis region for the detected temperature.

15. The charging method as claimed in claim 14, wherein regulating charging current of the battery includes:
    determining, after calculating a consumption power consumed by the charge switching device, whether the consumption power of the charge switching device exceeds a limit power setting value; and reducing the charging current below a specific threshold value when the consumption power of the charge switching device exceeds the limit power setting value.

16. The charging method as claimed in claim 15, wherein the consumption power of the charge switching device is set according to a charging voltage of the charger, an open circuit voltage of the battery, and the limit value of the charging current, and is obtained by multiplying the charging current by a difference between the charging voltage and the open circuit voltage.

* * * * *